United States Patent [19]

Kumar

[11] 4,343,751

[45] Aug. 10, 1982

[54] CLAY AGGLOMERATION PROCESS

[75] Inventor: Naresh Kumar, Cassopolis, Mich.

[73] Assignee: Lowe's, Inc., South Bend, Ind.

[21] Appl. No.: 186,836

[22] Filed: Sep. 15, 1980

[51] Int. Cl.³ ............................................... B01J 2/12
[52] U.S. Cl. ..................................... 264/37; 264/115; 264/117; 264/122
[58] Field of Search .................. 264/117, 122, 115, 37

[56] References Cited

U.S. PATENT DOCUMENTS 3,564,083  2/1971  Fournet et al. ...................... 264/117
4,241,001 12/1980  Lamond et al. ..................... 264/117
4,246,220  1/1981  Lamond et al. ..................... 264/117

OTHER PUBLICATIONS

Eirich Intensive Mixer Model DE 22 by Eirich Machines Ltd.

Primary Examiner—James R. Hall
Attorney, Agent, or Firm—Marmaduke A. Hobbs

[57] ABSTRACT

An agglomeration process in which clay fines alone or in combination with other materials are agglomerated to a usable pellet size for a variety of marketable end products. The clay fines are collected, prepared and blended with conditioners and/or other waste materials in the proportions necessary to produce the desired pellet characteristics. The blended materials are pre-weighed and measured, permitting batch feeding to the agglomerator. The agglomerated pellets are dried and screened, with the oversize pellets being passed through a granulator to reduce their size and then being re-screened, and the undersized pellets being recycled to the collecting step for reagglomeration. Hence, the process provides pellets of relatively uniform size with little or no waste from the agglomeration procedure. The pellets may be impregnated or coated with a variety of substances, including fertilizers, pesticides, odor reducing substances, and colorants to provide a variety of different end products, including cat box filler, fertilizers, soil conditioners and floor absorbent.

28 Claims, 5 Drawing Figures

CLAY AGGLOMERATION PROCESS

BACKGROUND OF THE INVENTION

In many industries a dust-like waste product known as fines is a by-product of a production process. An example of an industry producing fines as waste material is cat box filler manufacturing, wherein raw clay is treated and calcined to form an absorbent compound for use in cat boxes. Clay fines, which are the undersize particles that are unsuitable for the end product desired, are obtained both from the initial screening of the raw clay material and from the final screening of the end product before packaging for marketing. Thus, the fines include both calcined and non-calcined clay particles, and may range in size from just under the desired particle size to very fine dust or powder-like material. The clay fines may be generated during any of the steps of the manufacturing process, including granulation or crushing, drying, transporting, or any other operation wherein heat and/or stress operate to separate the material into separate and distinct groups. In the past the clay fines constituted waste and were disposed of, often by mixing the fines with water and discharging the mixture into slurry ponds or the like. Adequate disposal areas had to be provided near each manufacturing plant to handle the clay fines waste material, and the environment impact of the chosen fines handling method and disposal procedure had to be carefully analyzed and controlled. The amount of clay fines waste material can be substantial in some processes, with the effect being a significant economic burden on the overall manufacturing process to handle and dispose of the fines, thereby requiring an increase in the sale price of the marketed product to cover the cost of fines disposal. It is clear that the planning for and handling of clay fines has been totally an item of expense in industries such as cat box filler manufacturing, with no income generated from the fines material. Hence, any use for clay fines, and particularly a use adaptable to a variety of readily marketable products, will provide significant economic advantages within the industry.

Another waste product common in the United States is fly ash, which is a pozzolana composed of silicates and various oxides and which occurs as a waste product from coal combustion. Millions of tons of fly ash are created annually by factories, electric power generating stations and the like, and it has been estimated that only about 25% of all fly ash waste material is used in some form, usually as a component for road construction or in cement, with the remaining 75% constituting waste which has to be disposed of. The disposal of fly ash has created problems in some locations, requiring trucking of the ash for long distances to suitable disposal sites. Since coal is projected as being the fossil fuel with the longest future availablility, the production of fly ash will continue for many years to come and is likely to increase in amount. Since coal is used throughout the country, the availability of fly ash is fairly universal, and a suitable use for this widely available waste product will have a significant economic impact in the coal use area, as well as relieve a very significant disposal problem.

Other waste products from manufacturing processes which have caused economic burdens on their respective industries and have created disposal problems include peanut shells, sawdust and paper sludge, which is a combination of broken down cellulose fiber, pulp treating chemicals, clay, and water. A suitable process for using these and other herefore substantially non-usable waste products will provide manufacturing cost efficiency in the industries producing the waste, will open new fields of manufacture, and will eliminate the need for disposal sites near each operating plant.

SUMMARY OF THE INVENTION

Many of the aforementioned, and other, waste products have little or no utility in the form in which they exist at the time of their generation. The present invention, in its basic form, makes possible the creation of agglomerated pellets from clay fines. The characteristics of the clay only pellets can be altered by including different additive materials in the clay fines. Fly ash, paper sludge, sawdust, peanut shells and other materials, whether waste product or not, can be used to alter the density, moisture absorbency, odor absorbency and other pellet characteristics. The size of the pellets can be carefully controlled, and the method of the present invention is essentially a closed system wherein oversize and undersize pellets are reprocessed to provide the desired size of pellet.

Other characteristics of the present agglomeration process are evident from the following objects, of which one of the principal objects is to provide a process which will use waste products from existing industries to form an agglomerated pellet of marketable quality, and which may be used to form pellets for a variety of different end products in an energy efficient and cost efficient manner.

Another object of the present invention is to provide an agglomeration process which will use a wide variety of species of calcined or non-calcined clay fines, alone or in combination with fly ash, soda ash, gypsum powder or the like, as well as combined with fibrous waste products such as paper sludge, peanut shells, leaves, hay or other cellulose material, whether occurring as product manufacture waste or naturally occurring, and which creates pellets of uniform size with little or no waste, by reagglomerating the underside pellets and crushing and rescreening the oversize pellets.

Still another object of the present invention is to provide an agglomeration process which will use a variety of raw materials in differing combinations to produce a variety of different end products, including cat box filler, floor and industrial absorbents, carriers for pesticides and/or fertilizers, landscaping aids or the like, and which can be controlled to produce agglomerated end products of differing sizes and characteristics as the desired end product requires.

A further object of the present invention is to provide an agglomeration process which produces pellets of relatively uniform granular size by controlling the variable responsible for pellet size so that time alone is the principal controlling factor, and which is efficient with little or no waiting between the discharge of the agglomerated product and the initiation of the next agglomeration, by having sufficient preparatory steps before the agglomeration, and batch-type feeding of the prepared mixture.

These and other objects are accomplished through the use of the present agglomeration process. Clay fines and water are mixed to form a wet aggregate of discrete particles. The aggregate is subjected to a rolling action to form soft pellets, the size of which is controlled by the length of time the aggregate and newly formed pellets are subjected to the rolling action. The wet pellets are dried to remove most of the moisture, thereby forming a mass of dry frangible pellets having a generally spherical shape. The pellets are screened and packaged for commercial distribution. A variety of different waste products and other conditioners can be mixed into the wet aggregate to alter the pellet characteristics, and ingredients such as fertilizers and insecticides can be added for particular pellet uses.

Additional objects and advantages of the present invention will be obvious from the following detailed description and the accompanying drawings.

DESCRIPTION OF PREFERRED EMBODIMENT

Figure 1:
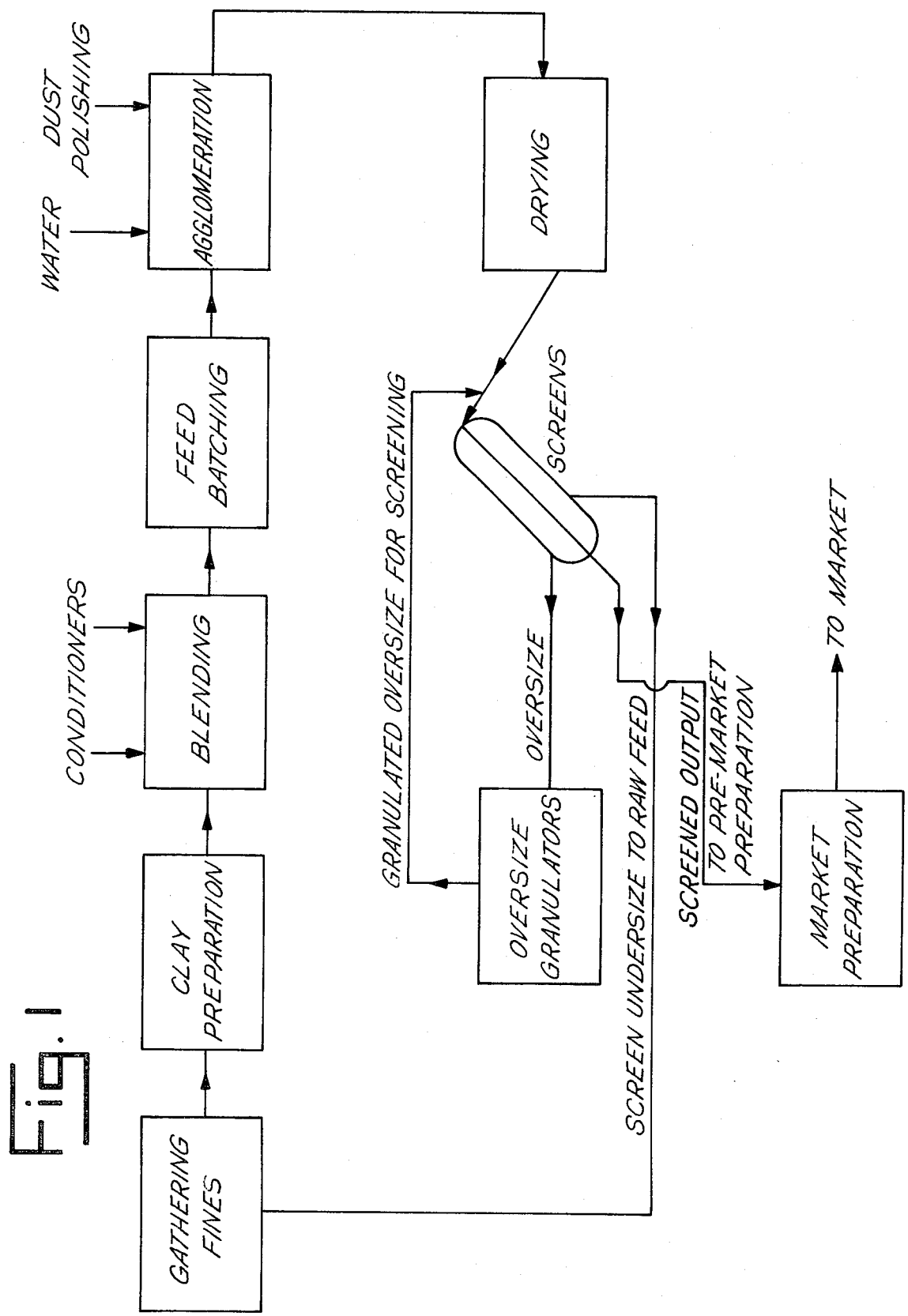
FIG. 1 is a flow diagram which illustrates the steps of an agglomeration process for clay fines, in accordance with the present invention.

Referring more specifically to the drawings, and to FIG. 1 in particular, a flow chart is shown for clay fine agglomeration in accordance with the present invention. The clay fines are gathered either as waste material from a clay utilization process, or from naturally occurring clay fines. The clay is subjected to an initial preparation step which may include screening and crushing to remove large clumps of clay and provide appropriate size fines for the agglomeration, as well as cleaning to remove contaminants which may be present, such as roots, stones, or by-products from the initial clay use. Conditioners may be added including fertilizers, colorants, or other waste materials, depending upon the ultimate use intended for the agglomerated pellets, and the prepared clay fines are then weighed and measured into appropriate size batches for feeding into the agglomerator where the clay is mixed with water to form a wet aggregate of discrete particles. Following a rolling process in the agglomerator, the wet pellets are dried at elevated temperatures to remove most of the added water, and are screened. The oversize pellets from the screening are crushed and are cycled for rescreening, and the undersized particles are routed to the initial gathering step for reagglomeration. The screened output is cycled to premarket preparation where various additives may be used, and the product is packaged and distributed.

The present agglomeration process can be used to form pellets from many different types of clay fines from various clay mineral families, including those of the smectite, halloysite, montmorillonite, bentonite, hectorite, Fuller's earth, kaolinite, or diatomite families, or in general terms, from any member of the hydrous aluminous silicates. The process works equally well for pure forms of clay fines, as those previously described, and for mixtures of various clay mineral species such as, for example, two layer kaolinites and halloysites, three layer montmorillonites of both the elongate and equidimensional types, nonexpanding lattice groups such as illites, and chain structure families such as attapulgites, sepiolites or palygorskites. The present agglomeration process has wide range applicability, and the above listing of clay groups is only a small example of suitable clays. As will be described more completely hereinafter, many other raw materials, including waste products other than clay fines, can be used advantageously as conditioner materials in the present process.

Once the clay is gathered for agglomeration, various preparation steps are performed before the actual pellet formation is begun. Foreign materials such as rocks, roots or other contaminants are removed from the clay, and the fines are crushed, if needed, to the most desirable size for pellet formation. Generally, the clay size should be thirty (30) U.S. Standard Mesh or smaller, with the particles preferably being smaller than forty (40) mesh. The present agglomeration process works well for either noncalcined fines or for a combination of noncalcined and calcined fines; hence, the waste material from clay utilization processes wherein the clay is calcined, such as, for example, cat box filler manufacturing, can be agglomerated through use of the present invention to create usable and marketable products. If calcined fines are used, the calcined fines should be crushed if need be to at least fifty (50) to sixty (60) mesh or smaller, and in the preferred process about ninety-nine percent (99%) of the calcined fines should be one-hundred (100) mesh or smaller. As previously mentioned, one-hundred percent (100%) noncalcined fines can be used in the present agglomeration process; however, if calcined fines are used, generally up to about thirty-five (35) parts of calcined fines may be used with sixty-five (65) parts of noncalcined fines. Water constitutes a significant portion of the aggregate mixture to be formed; hence, since water will be added, the moisture content of the clay fines themselves before the addition of the water is not critical; however, for economical production of suitable pellets having consistent characteristics, the moisture content of the clay fines should not vary significantly from an average moisture range. The total amount of water in the wet aggregate mixture to be agglomerated preferably is controlled to form the desired type of pellet, and wide variations in the moisture content of the clay itself from day to day, or from batch to batch, inversely affect the amount of water which must be added to form the wet aggregate. To eliminate the need for complicated moisture sensing equipment for determining the amount of water to be added to the mixture, it is preferred that, from day to day, or from batch to batch, the moisture content of the clay fines vary at most only about one percent (1%) from an average figure.

It has been found that for every one hundred (100) parts of dry clay, forty-one (41) parts of water are preferred for pellet formation. The preferred quantity amounts to about twenty-nine and one-tenth percent (29.1%) water in the wet aggregate mixture; however, amounts between twenty percent (20%) and fifty percent (50%) can be used. Hence, in the preferred process, if only dried clay fines are used, seventy and nine-tenths (70.9) parts clay should be used with twenty-nine and one-tenth (29.1) parts of water to yield one hundred (100) parts of wet aggregate. If calcined fines are used, up to twenty-four and eight-tenths (24.8) parts calcined fines, thirty-five percent (35%) of the total clay mass, may be used with forty-six and one-tenth (46.1) parts of dried noncalcined fines, sixty-five percent (65%) of the total clay mass, and twenty-nine and one-tenth (29.1) parts of water to yield one hundred (100) parts of wet aggregate. Thus, it is seen that twenty-nine and one-tenth (29.1) parts of water in every one hundred (100) parts of wet agglomerate are preferred whether noncalcined fines are used alone or in a mixture with calcined fines.

Various conditioners can be added to the clay fines to alter the characteristics of the pellets formed from the present process. Conditioners which may be used advantageously include waste materials such as paper sludge, fly ash and peanut shells as well as other organic fiber materials such as hay, leaves and grass, and nonfiber materials such as soda ash and gypsum powder. The addition of fly ash yields a pellet which absorbs and adsorbs odor in excess of that which a pure clay agglomerate can absorb and adsorb. The fly ash, in powdered form, may constitute between about five and fifty percent (5 and 50%) of the total mass of the agglomerate; however, if fly ash and clay fines are used alone, without other added raw materials, the preferred amount of fly ash is between about ten percent (10%) and thirty-three percent (33%) of the total mass. The resulting agglomerate is more effective in controlling odor, is more resistant to deterioration through attrition, and is less dust producing than is an agglomerate which does not contain fly ash.

The clay fines, with or without fly ash included therein, can be blended with still other raw materials which heretofore have constituted waste. The addition of paper sludge creates a smooth and stable pellet which is substantially dustless and has acceptable absorbency when used for litter box filler or other moisture absorbing type products. The amount of paper sludge used in the agglomeration process may be up to about fifty percent (50%) of the total mass; however, the actual amount which can be used depends on the amount of water in the paper sludge, as both dewatered and wet paper sludge can be used. If the paper sludge is in a one hundred percent (100%) dry state, an acceptable peleted mass may be formed by using paper sludge in amounts between ten percent (10%) and thirty-five percent (35%) of the total mass of the agglomerate solids. Although paper sludge commonly has offensive odors, the clay combined therewith during blending and agglomerating normally absorbs any offensive odors present, and the resulting pellets from the agglomeration process are absorbent and clean smelling. If trace odors do exist, the addition of perfumes and other fragrances will eliminate any offensive odors. Other organic fiber waste materials may be added to the clay fines, such as crushed dry leaves, crushed hay or other cellulosic material, and in some applications, may constitute from five to ninety-five percent (5 to 95%) of the bulk agglomerate mass; however, more usually the fibrous material will constitute ten percent (10%) to forty percent (40%) of the mass.

In addition to, or in place of fly ash, paper sludge, or other organic fiber waste, various other raw materials may be combined with the clay fines. For example, highly absorbent clay agglomerates can be formed by adding up to about five percent (5%) soda ash to the solids of the agglomerate mixture. When one percent (1%) soda was added to ninety-nine percent (99%) dried fines the resultant agglomerate demonstrated a liquid absorbency of one hundred sixty-seven percent (167%), which is a fifty-two percent (52%) increase over the normal one hundred ten percent (110%) absorbency of dried fine-only agglomerates. If light density agglomerates are desirable, up to about fifty percent (50%) peanut shells may be added to the clay fines. Other raw materials which may be used include gypsum powder, raw brick making clay, sawdust, diatomaceous earth, and Bentonitic clays. By properly selecting the additive materials to be used with clay, characteristics such as weight and absorbency can be varied substantially and controlled to yield the ideal pellet for the product being made.

After the particular raw materials and conditioners to be used have been selected, screened, crushed or otherwise prepared, and the appropriate proportions thereof determined, the materials are preweighed or measured and thoroughly mixed in the blending stage. This is normally performed before the addition of water; hence, dry continuous or batch mixers such as the commonly known Litteford mixers are appropriate for this operation. The mixed raw materials are preweighed and held in hoppers in a state of preparedness for agglomeration. Efficiency is promoted in the overall agglomeration process by providing full batch feeding of the agglomerator rather than by weighing and measuring the material during the feeding of the agglomerator. Thus, all measuring for a subsequent batch is being done while one batch is undergoing pelletization in the agglomerator, and less time is wasted between batches, in that a single premeasured batch is fed into the agglomerator upon completion of pelletization of the prior batch. For this step, hoppers, batch weighers and the like are required, all of which are presently available and well known in the material processing industry.

Figure 2:
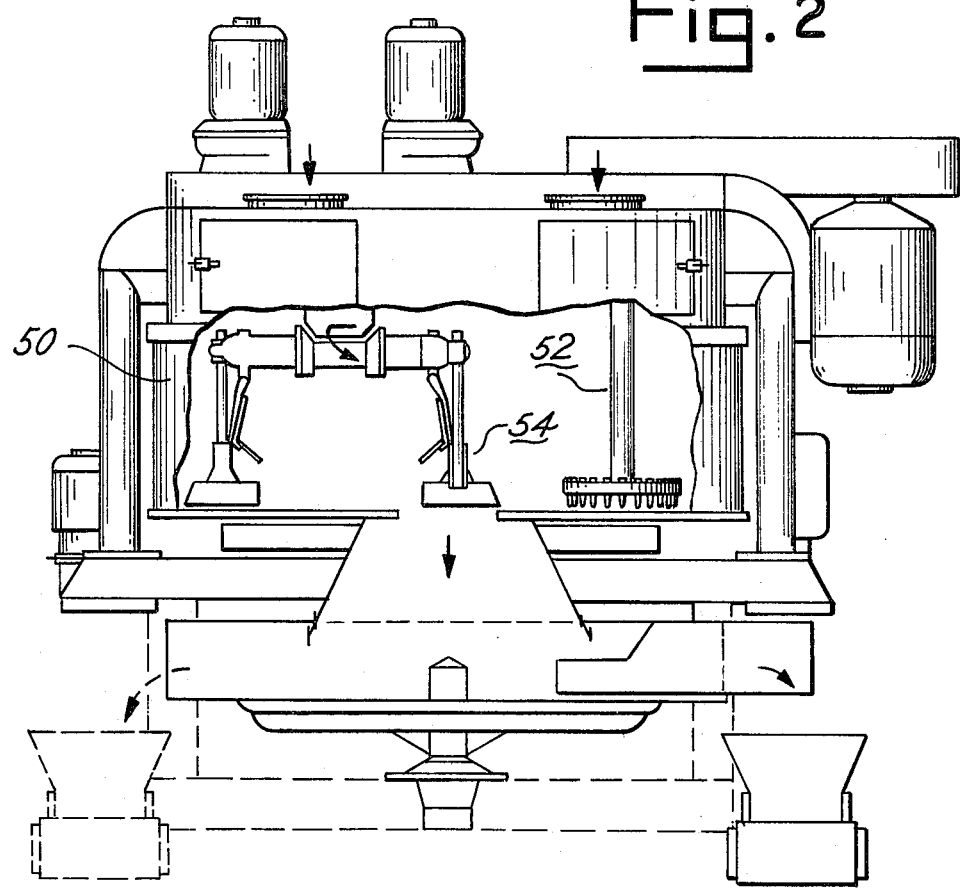
FIG. 2 is an elevational view, partially broken away, of one satisfactory type of intensive mixer agglomerator which can be advantageously used for pellet formation in practicing the present invention.
Figure 3:
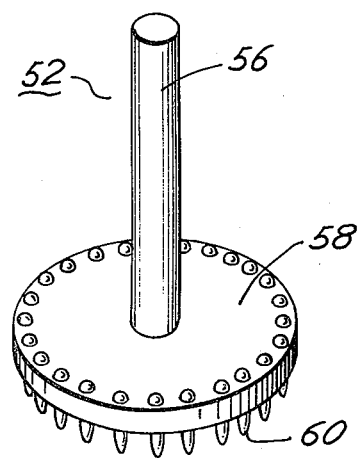
FIG. 3 is a perspective view of a high energy rotor of preferred design for use in the agglomerator.
Figure 4:
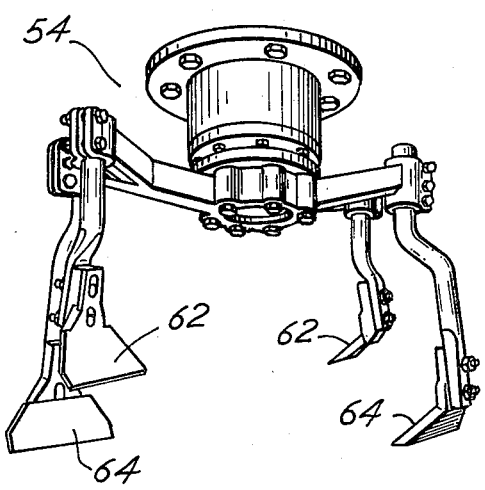
FIG. 4 is a perspective view of a mixing star for use in the agglomerator of the preferred design for clay fine agglomeration.

The actual pellet formation is performed satisfactorily by agglomerators of the type known as intensive mixer agglomerators. Suitable equipment is illustrated in FIGS. 2 through 4 wherein an Eirich intensive mixer agglomerator is shown, having the special tooling which is preferred for clay fines pellet formation. The intensive mixer agglomerator includes a pan 50 which revolves at a relatively slow speed, normally about one hundred (100) rpm, and moves the mixture to be agglomerated between a high energy rotor 52 and a mixing star 54. In the preferred design, the rotor includes spindle 56 and a rotor plate 58 having tips 60 extending downwardly from the periphery of the plate, with only minimal clearance between the tips and the bottom of the pan. The rotor spins at between fifteen hundred (1500) and two thousand (2000) rpm, and imparts a rolling motion to the material, to form the pellets. The mixing star 54 spins at the same speed as the pan, but in the opposite direction, and has upwardly disposed ploughs 62 and downwardly disposed ploughs 64. The principal function of the mixing star is to assist in moving the aggregate in the pan toward the rotor. In a small capacity agglomerator the star may not be required, and in large capacity agglomerators, more than one star may be required to maintain movement of the material and prevent the formation of stagnant areas in the material as the pan revolves. The combined action of the pan, rotor and star causes the aggregate material in the pan to be mixed, beaten and rolled in a balling effect to create pellets. The movement introduced to the wet aggregate mixture during agglomeration, the time, mixing speed, and sequence of addition of ingredients comprise the variables which must be properly maintained for suitable pellet formation. By carefully controlling the four variables, suitable and uniform pellets can be obtained. One of the distinct advantages of the present pellet formation method is that, if the other variables are held constant, the size of the pellets can be controlled by the length of time the material is processed in the agglomerator. The pellet size increases with time, with the percentage of coarser mesh pellets increasing as the percentage of finer mesh pellets decreases. The present agglomeration process is suitable for forming pellets from about 48 U.S. Standard Mesh up to about one-quarter inch in diameter, and the time periods for the formation thereof may range from thirty (30) seconds to fifteen (15) minutes. The inclusion of fibrous materials such as hay, leaves, paper sludge or peanut shells in the wet aggregate mixture promotes efficiency in the overall agglomeration process by continuously scouring and cleaning the interior surfaces of the agglomerator.

Specific phases have been identified which occur during the process of pellet formation in the agglomerator. The first phase is power homogenization which may last only a matter of seconds or up to about three (3) minutes, depending upon the batch materials. In the case of agglomerating only clay fines and water, this phase lasts up to one (1) minute, with the most typical time duration being less than thirty (30) seconds. Power homogenization is essentially a step in which a thorough mixing of the batch materials occurs within the agglomerator.

Figure 5:
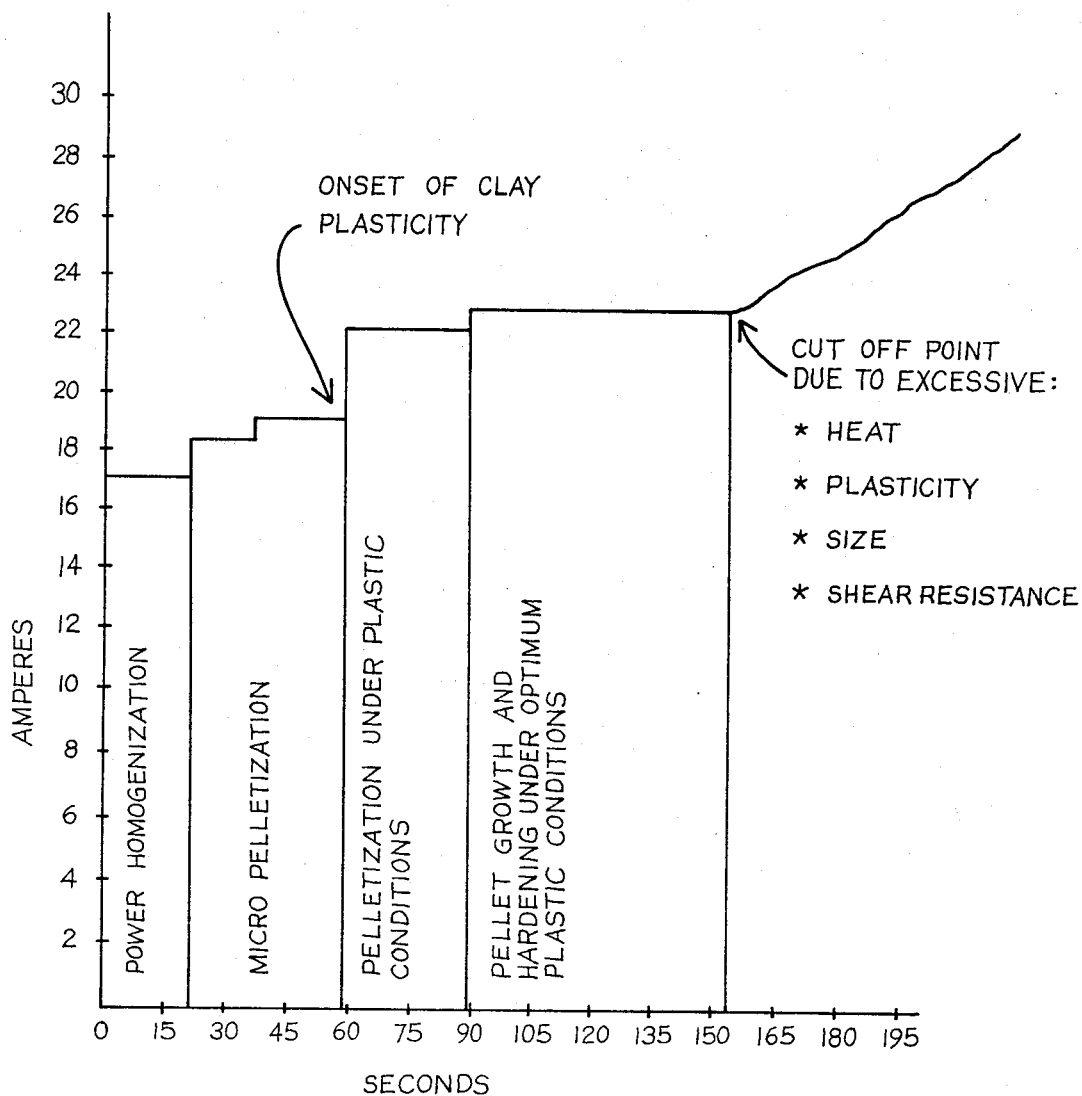
FIG. 5 is a chart showing a power agglomeration analysis, referred to as "Chart I".

Following the power homogenization step, a phase occurs which will be referred to as micro-pelletization. This phase may last from fifteen (15) seconds to about three (3) minutes, but more typically will last from fifteen (15) seconds to ninety (90) seconds. During the second phase the actual pellet formation begins. The end of the micro-pelletization phase is indicated by a sharp increase in power usage which occurs at the onset of the third phase, referred to herein as pelletization under plastic conditions, because, at this time, the mass in the agglomerator will have developed a certain amount of plasticity. The length of this phase may be from about fifteen (15) seconds to three (3) minutes, but more frequently will be between thirty (30) seconds and one (1) minute. Following the pelletization under plastic conditions, a final phase is reached wherein pellet growth occurs. This final phase is ended when full plastic conditions are reached, and the mass becomes hot due to the physical energy expended in working on the mass. The onset of full plastic conditions is the end point of the pellet formation in the agglomerator. Chart I of FIG. 5 indicates the elapsed time and power variations which characterize the above mentioned phases of the agglomeration process. The time intervals and power requirements will change with different types of clay and with the addition of various conditioner materials, and Chart I is only an indication of a typical midrange agglomeration analysis. Generally, it may be stated that from three (3) to fifty (50) kilowatt hours are required for producing one ton of finished wet pellets from the time the raw materials and water are placed into the agglomerator to the time in which the wet pellets are emptied from the agglomerator. Formation of pellets from noncalcined Fuller's earth requires from five (5) to twenty (20) Kwh per ton of agglomerate.

Following the agglomeration step in the process, the wet pellets are emptied from the agglomerator and transported to drying equipment. The pellet will be about twenty-nine percent (29%) moist and must be dried to approximately four percent (4%) moisture content for convenient product handling. Movement of the wet agglomerate pellet mass during transport and drying must be gentle, it that the wet and semi-soft pellets will fracture easily. It is also desirable to dry the pellets in a manner which reduces the tendency of the pellets to coalesce. Various types of drying apparatus are suitable; however, turbo-stack drying systems utilizing vertically stacked discs over which the pellets gently cascade have been found most suitable. The low energy turbo dryers are particularly advantageous in that they provide continuous and uniform drying of the pellets, with little dust creation or pellet fracture through attrition, and the dried pellets are of relatively uniform shape. Other suitable, though less preferably, dryers include apron systems and fluid bed systems.

Following the completion of the drying step the now dried pellets are transported to screening equipment. Undersize pellets are fed back to the clay gathering and preparation step to undergo reagglomeration. The oversize pellets are transported to granulators for crushing and are then rescreened. The final pelletized and screened material is prepared for market. The preparation may include the addition of perfumes, odor control agents, colorants or the like, in addition to packaging. The market preparation stage may also include such steps as the addition of fertilizers and/or insecticides, if the product is to be used for agricultural purposes. Insect control through the use of pheromones is one particularly advantageous pellet application. Alternatively, fertilizers or the like may be added as a conditioner prior to the agglomeration step, to become thoroughly mixed with the pellets. The pellets also may be used for cat box filler material and industrial absorbents. Pellets manufactured by the present process are relatively dustless when compared to conventionally formed pellets made by a process of clay slicing, drying, crushing and screening. More uniform pellet size can be achieved through the present process than through prior methods, in that the overside pellets are crushed and rescreened, and the undersize pellets are reagglomerated. By properly controlling the variables in pellet formation, the size distribution of the pellets can be directed toward the desired pellet size. The pellets formed through the present process are generally of round shape and will remain free-flowing in bins, silos and other receptacles. Further, specific pellet characteristics such as absorbency and bulk density can be achieved through the addition of one or more conditioners to the clay fines.

The present process is useful in making pellets from almost any clay waste. Other abundantly available, heretofore nonuseful waste products can be added to the clay to form pellets having particularly advantageous characteristics in some applications. Hence, the process uses readily available materials which can be obtained at little or no cost, and the process manufactures a large variety of already widely used end products. Disposal problems, both finanical and environmental, are substantially reduced by the present process, at acceptable energy and cost expenditure.

EXAMPLES 1 THROUGH 13

Noncalcined clay fines were screened to remove foreign materials, and were crushed to provide particles of forty (40) U.S. Standard mesh or smaller. Calcined fines were also crushed and screened to ninety-nine percent (99%) minus one hundred (100) mesh. A variety of different conditioner materials including peanut shells, gypsum, caustic soda, paper sludge, fly ash and sawdust were powdered. A sample of dried fines alone was agglomerated, and various mixtures of dried fines, montmorillonite clay, coarse red fines, diatomaceous earth and the previously mentioned conditioner materials were mixed and blended in various proportions. The blended materials were pelletized in an Eirich intensive mixer agglomerator. The amount of water used in the process varied from sample to sample. Each pellet sample was dried to approximately four percent (4%) moisture, and various physical characteristics, including bulk density and absorbency, of each sample were measured, which indicated that a wide variety of pellet characteristics can be achieved. The bulk density of the pellets varied between twenty-ning and five-tenths (29.5) pounds per cubic foot and forty-nine (49) pounds per cubic foot; hence, the pellet weight can be controlled to provide the most desirable weight of pellet for the purpose for which the pellet will be used. Absorbency varied between seventy-eight percent (78%) and one-hundred sixty-seven percent (167%), again demonstrating that a pellet can be specifically tailored for optimum characteristics. Acceptable pellets were formed using a high clay fines content and using as low as thirty-two percent (32%) clay with higher percentages of other raw materials and/or waste products. The results of the measurements are recorded in Chart 2.

group was measured, and the results are recorded in Chart 3.

CHART 3

| Sample | Bulk Density vs Particle Size | |
|---|---|---|
| | Pellet Size Agglomerated Fines | Bulk Density |
| 014 | 8–10 Mesh | 50.8 lbs/cft |
| 015 | 10–12 Mesh | 50.1 lbs/cft |
| 016 | 12–16 Mesh | 49.3 lbs/cft |
| 017 | 16–20 Mesh | 48.9 lbs/cft |
| 018 | 20–30 Mesh | 47.4 lbs/cft |

EXAMPLES 19–26

To establish a means by which the size of the pellets in a particular batch could be directed toward a desired pellet size, clay fines were crushed, screened and agglomerated in an intensive mixer agglomerator as provided in the present invention. All variables in the pellet formation were kept constant. Samples of the pellets were taken at thirty (30) second intervals beginning at two (2) minutes into the agglomeration step, and were taken up to six (6) minutes of agglomeration. The pellet size distribution of each sample, was measured and the results thereof are recorded in Chart 4, wherein it can

CHART 2

| Sample | Constituents | % Moisture Content | Added Water | Bulk Density | Absorbency |
|---|---|---|---|---|---|
| 001 | 76% MM Clay<br>24% Peanut Shell | 23.5 | 4 kg | 49 lbs/cft | |
| 002 | 58% Dried Fines<br>29% Calcined Dust<br>13% Gypsum (Ind.) | 38% | 6.5 kg | 46 lbs/cft | 148% |
| 003 | 80% Dried Fines<br>20% Diatomaceous Earth | 31% | 11 kg | 45.6 lbs/cft | 112% |
| 004 | 100% Dried Fines | 30% | 13 kg | 44.8 lbs/cft | 110% |
| 005 | 99% Dried Fines<br>1% Caustic Soda | 29% | 12.5 kg | 42 lbs/cft | 167% |
| 006 | 68% Diatomaceous Earth<br>32% Dried Fines | 45% | 18 kg | 40 lbs/cft | 106% |
| 007 | 65% Dried Fines<br>35% Coarse Red Fines | 29% | 12.5 kg | 40.4 lbs/cft | 106% |
| 008 | 50% Dries Fines<br>50% Paper Sludge | 20%<br>33.5% | 5 kg | 38 lbs/cft | 78% |
| 009 | 75% Dried Fines<br>25% Fly Ash | 26% | 8 kg | 42.5 lbs/cft | 80% |
| 010 | 33% Dried Fines<br>33% Fly Ash<br>33% Sawdust | 23% | 4.5 kg | 30.7 lbs/cft | 84% |
| 011 | 60% Dried Fines<br>40% Gypsum (Ind.) | 31% | 11 kg | 49 lbs/cft | 112% |
| 012 | 97% Dried Fines<br>3% Soda | 33% | 7.5 kg | 42 lbs/cft | 164% |
| 013 | 38% Dried Fines<br>16% Paper Sludge<br>22% Fly Ash<br>11% Sawdust<br>6% Gypsum (Ind.)<br>6% Peanut Shell Powder<br>1% Soda | 24.8% | 6 kg | 29.5 lbs/cft | 88% |

EXAMPLES 14 THROUGH 18

It was sought to be determined what the bulk density of pellets from clay fines is in relation to the size of the pellets. To make this determination, clay fines were crushed, screened and agglomerated as provided in the present invention. The pellets from the agglomeration were dried and screened to separate the pellets into groups of eight (8) and ten (10) mesh size, ten (10) to twelve (12) mesh size, twelve (12) to sixteen (16) mesh size, sixteen (16) to twenty (20) mesh size, and twenty (20) to thirty (30) mesh size. The bulk density of each be seen that as time in the agglomerator increases, the percentage of the larger mesh pellets increases as the percentage of smaller mesh pellets decreases.

CHART 4

| Sieve Analysis On Agglomerated Dried Fines Taken At Different Intervals: | | | | | | | | | |
|---|---|---|---|---|---|---|---|---|---|
| | | | | Size Distribution in % | | | | | |
| Sample | Min. | +4 | +6 | +8 | +12 | +20 | +30 | +40 | −40 |
| 019 | 2.0 | 3.6 | 7.7 | 12.9 | 14.8 | 34.6 | 11.0 | 7.3 | 7.8 |
| 020 | 2.5 | 2.5 | 7.2 | 15.3 | 18.8 | 39.7 | 8.5 | 4.4 | 3.4 |
| 021 | 3.0 | 1.7 | 8.5 | 19.5 | 24.4 | 36.5 | 4.8 | 2.1 | 2.3 |

CHART 4-continued

Sieve Analysis On Agglomerated Dried Fines Taken At Different Intervals:

| Sample | Min. | +4 | +6 | +8 | +12 | +20 | +30 | +40 | −40 |
|---|---|---|---|---|---|---|---|---|---|
| 022 | 3.5 | 4.1 | 16.3 | 30.0 | 24.4 | 21.8 | 1.7 | .7 | .8 |
| 023 | 4.0 | 8.4 | 23.3 | 33.2 | 20.6 | 12.6 | .9 | .3 | .5 |
| 024 | 4.5 | 13.2 | 32.1 | 33.4 | 15.5 | 4.4 | .6 | .1 | .4 |
| 025 | 5.0 | 22.8 | 34.7 | 27.9 | 11.6 | 4.2 | .3 | .1 | .2 |
| 026 | 6.0 | 41.4 | 35.2 | 16.2 | 4.5 | 2.0 | .1 | .02 | .4 |

Although a process and several variations thereof for producing clay pellets have been described in detail herein various changes may be made without departing from the scope of the present invention.

I claim:

1. An agglomeration process for producing clay pellets from clay fines material, comprising the steps of preparing the clay fines material for agglomeration, mixing said prepared clay fines material and water to form a wet aggregate of discrete particles, subjecting said aggregate to a rolling action for a time sufficient to form soft pellets therefrom of a predetermined size and of a general spherical shape, subjecting said pellets to an elevated temperature for a period of time sufficient to remove most of the water added in forming said aggregate, thereby to form a mass of substantially dry, firm and frangible pellets, and screening said mass of pellets to separate the pellets of predetermined size from other size pellets present in said mass.

2. An agglomeration process for producing clay pellets from clay fines material as defined in claim 1 in which said wet aggregate is formed by the addition of twenty to fifty percent by weight of water to said clay fines material.

3. An agglomeration process for producing clay pellets from clay fines material as defined in claim 1 in which said wet aggregate is formed by the addition of about thirty percent by weight of water to said clay fines material.

4. An agglomeration process for producing clay pellets from clay fines material as defined in claim 1 in which said clay fines material consists of a mixture of calcined and noncalcined fines.

5. An agglomeration process for producing clay pellets from clay fines material as defined in claim 1 in which the preparing step includes adding organic fiber material to said clay fines material in an amount up to fifty percent of the total mass of solids after said adding step.

6. An agglomeration process for producing clay pellets from clay fines material as defined in claim 1 in which the preparing step includes adding fly ash to said clay fines material in an amount between about five and fifty percent of the total mass of solids after said adding step.

7. An agglomeration process for producing clay pellets from clay fines material as defined in claim 1 in which the preparing step includes adding gypsum to said clay fines material in an amount between about five and thirty percent of the total mass of solids after said adding step.

8. An agglomeration process as defined in claim 1 in which said preparing step includes crushing noncalcined clay fines to a size of not greater than about 30 mesh.

9. An agglomeration process as defined in claim 1 in which said preparing step includes crushing noncalcined clay fines to a size of not greater than about 30 mesh, adding conditioners to the clay and blending the clay and conditioners.

10. An agglomeration process as defined in claim 1 in which said preparing step includes crushing calcined fines to a size of not greater than about 100 mesh.

11. An agglomeration process as defined in claim 11 in which said preparing step includes crushing calcined fines to a size of not greater than about 100 mesh.

12. An agglomeration process as defined in claim 1 in which said preparing step includes adding crushed peanut shells to the clay fines.

13. An agglomeration process as defined in claim 1 in which said preparing step includes adding gypsum to the clay fines.

14. An agglomeration process as defined in claim 1 in which said preparing step includes adding sawdust to the clay fines.

15. An agglomeration process as defined in claim 1 in which said preparing step includes adding soda ash to the clay fines.

16. An agglomeration process as defined in claim 1 in which said preparing step includes adding paper sludge to the clay fines.

17. An agglomeration process as defined in claim 1 in which said preparing step includes adding fly ash to the clay fines.

18. An agglomeration process as defined in claim 1 in which said preparing step includes adding organic fiber to the clay fines.

19. An agglomeration process as defined in claim 1 in which said preparing step includes adding insecticides to the pellets.

20. An agglomeration process as defined in claim 1 in which said preparing step further includes adding fertilizer to the pellets.

21. An agglomeration process for producing clay pellets from clay fines, comprising preparing the clay fines material for agglomeration, including mixing about twenty nine (29) parts of water with at least forty six (46) parts of noncalcined clay fines and up to twenty four (24) parts of calcine clay fines to yield about one hundred (100) parts of wet aggregate, subjecting said aggregate to a rolling action for a time sufficient to form soft pellets therefrom of a predetermined size and of a generally spherical shape, subjecting the pellets to an elevated temperature for a period of time sufficient to dry the wet pellets to a moisture content of about four percent (4%) thereby to form a mass of substantially dry, firm and frangible pellets, and screening said mass of pellets to separate the pellets of predetermined size from other size pellets present in the mass.

22. A process as defined in claim 21 in which said step of subjecting said aggregate to a rolling action is performed in an intensive mixer agglomerator.

23. A process as defined in claim 21 in which said drying step is performed by a turbo stack drier.

24. A process as defined in claim 21 in which the step of preparing the clay fines material includes adding conditioners to the mixture.

25. An agglomeration process for producing clay pellets from clay fines material, comprising the steps of gathering clay fines, preparing the clay fines for agglomeration, dividing said fines into batch size lots, adding a sufficient quantity of water for agglomeration, batch feeding the water and clay fines into an agglomerator, agglomerating the batch fed material for a predetermined time to achieve desired pellet size, drying the pellets, screening the dried material for separating pellets of a predetermined size from pellets of larger and smaller sizes in the material, granulating the larger size pellets from said screening step, rescreening the granulated material to separate material under a preselected size, and feeding the material under said preselected size from said rescreening step back to said gathering step.

26. An agglomeration process as defined in claim 25 in which said preparing step includes adding conditioners to the clay and blending the clay and conditioners prior to said feeding of the agglomerator.

27. An agglomeration process as defined in claim 25 in which said preparing step includes crushing noncalcined clay fines to a size of not greater than about 30 mesh.

28. An agglomeration process as defined in claim 27 in which said preparing step includes crushing calcined fines to a size of not greater than about 100 mesh.

* * * * *